(12) United States Patent
Wright et al.

(10) Patent No.: US 10,965,092 B2
(45) Date of Patent: Mar. 30, 2021

(54) PULSED LASERS BASED ON SPATIOTEMPORAL MODE-LOCKING

(71) Applicant: Cornell University, Ithaca, NY (US)

(72) Inventors: Logan Wright, Ithaca, NY (US); Frank Wise, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/237,342

(22) Filed: Dec. 31, 2018

(65) Prior Publication Data
US 2019/0207361 A1    Jul. 4, 2019

Related U.S. Application Data

(60) Provisional application No. 62/612,273, filed on Dec. 29, 2017.

(51) Int. Cl.
| | |
|---|---|
| *H01S 3/11* | (2006.01) |
| *H01S 3/08* | (2006.01) |
| *H01S 3/067* | (2006.01) |
| *H01S 3/06* | (2006.01) |
| *H01S 3/16* | (2006.01) |

(52) U.S. Cl.
CPC .......... *H01S 3/1115* (2013.01); *H01S 3/0602* (2013.01); *H01S 3/06712* (2013.01); *H01S 3/06754* (2013.01); *H01S 3/0804* (2013.01); *H01S 3/08086* (2013.01); *H01S 3/1112* (2013.01); *H01S 3/06791* (2013.01); *H01S 3/0805* (2013.01); *H01S 3/08027* (2013.01); *H01S 3/1618* (2013.01); *H01S 3/1625* (2013.01); *H01S 3/1636* (2013.01)

(58) Field of Classification Search
CPC .. H01S 3/1115; H01S 3/0602; H01S 3/06754; H01S 3/0804; H01S 3/08086; H01S 3/06791; H01S 3/1618; H01S 3/1625; H01S 3/1636; H01S 3/08022
See application file for complete search history.

(56) References Cited

U.S. PATENT DOCUMENTS

2018/0159292 A1*   6/2018   Schaar ................... G02F 1/39

OTHER PUBLICATIONS

Akturk, S. et al., Spatio-temporal couplings in ultrashort laser pulses, J. Opt. 12, 093001 (2001).
Antenucci, F. et al., Statistical mechanics models for multimode lasers and random lasers. Philos. Mag. 96 (7-9), 704-731 (2016).
Auston, D., Transverse mode locking, IEEE J. Quant. Electron 4 (6), 420-422 (1968).
Baumgartl, M. et al., Sub-80 fs dissipative soliton large-mode-area fiber laser. Opt. Lett, 35 (13), 2311-2313 (2010).
Cao, H. et al., Random laser action in semiconductor powder, Phys. Rev. Lett. 82 (11), 2278 (1999).
Chong, A. et al., Ultrafast fiber lasers based on self-similar pulse evolution: a review of current progress. Rep. Prog. Phys., 78 (11), 113901 (2015).

(Continued)

*Primary Examiner* — Armando Rodriguez
(74) *Attorney, Agent, or Firm* — Perkins Coie LLP

(57) ABSTRACT

The technology disclosed in this patent document allows mode locking of both selected longitudinal and transverse modes to produce laser pulses. The laser light produced based on such mode locking exhibits a 3-dimensional mode profile based on the locked longitudinal and transverse modes.

20 Claims, 11 Drawing Sheets

(56) References Cited

OTHER PUBLICATIONS

Chong, A. et al., Properties of normal-dispersion femtosecond fiber lasers, J. Opt. Soc. Am. B 25, 140-148 (2008).

Christov, I.P. et al., Space-time focusing of femtosecond pulses in a Ti:sapphire laser, Opt. Lett. 20, 309 (1995).

Conti, C. et al., Condensation in disordered lasers: Theory, 3 D+ 1 simulations, and experiments. Phys. Rev. Lett. 101 (14), 143901 (2008).

Cote, D. et al., Period doubling of a femtosecond Ti: sapphire laser by total mode locking, Opt. Lett. 23 (9), 715-717 (1998).

"Cundiff, S.T. et al., Colloquium: Femtosecond optical frequency combs,Rev. Mod. Phys. 75, 325 (2003)."

Demas, J. et al., Intermodal nonlinear mixing with Bessel beams in optical fiber. Optica, 2 (1), 14-17 (2015).

Guang, Z. et al., Complete characterization of a spatiotemporally complex pulse by an improved single-frame pulse-measurement technique. J. Opt. Soc. Am. B, 31 (11), 2736-2743 (2014).

Guenard, R. et al., Kerr self-cleaning of pulsed beam in an ytterbium doped multimode fiber. Opt. Express 25 (5), 4783-4792 (2017).

Hellwig, T. et al., Optically induced mode conversion in graded-index fibers using ultra-short laser pulses. Appl. Phys. B, 112 (4), 499-505 (2013).

Horak, O.P. et al., "Multimode Nonlinear Fibre Optics: Theory and Applications", Recent Prog. Opt. Fiber Res. (Yasin, M.) 3-24 (2012).

Jirauschek, C. et al., Spatiotemporal Gaussian pulse dynamics in Kerr-lens mode-locked lasers, J. Opt. Soc. Am. B 20, 1356-1368 (2003).

Krupa, K. et al., Spatial beam self-cleaning in multimode fibre. Nat.Photon.(2017), p. 237.

Leonetti, M. et al., The mode-locking transition of random lasers. Nat. Photon. 5 (10), 615-617 (2011).

Liu, Z. et al., Kerr self-cleaning of femtosecond-pulsed beams in graded-index multimode fiber, Optics Letters 41(16), 3675-3678 (2016).

Lopez-Galmiche, G. et al., Visible supercontinuum generation in a graded index multimode fiber pumped at 1064 nm. Opt. Lett. 41 (11), 2553-2556 (2016).

Mocker, H.W. et al., Mode competition and self-locking effects in a Q-switched ruby laser, Appl. Phys. Lett. 7 (10), 270-273 (1965).

Nazemosadat, E. et al., Nonlinear switching in multicore versus multimode waveguide junctions for mode-locked laser applications. Opt. Express 21, 30739-45 (2013).

Nixon, M. et al., Real-time wavefront shaping through scattering media by all-optical feedback. Nat. Photon. 7 (11), 919-924 (2013).

Picozzi, A. et al., Optical wave turbulence: Towards a unified nonequilibrium thermodynamic formulation of statistical nonlinear optics. Phys. Rep., 542 (1), 1-132 (2014).

Poletti, F. et al., Description of ultrashort pulse propagation in multimode optical fibers. J. Opt. Soc. Am. B 25, 1645-1654 (2008).

Pourbeyram, H. et al., Stimulated Raman scattering cascade spanning the wavelength range of 523 to 1750 nm using a graded-index multimode optical fiber. Appl. Phys. Lett. 102, 201107 (2013).

Raghavan, S. et al., Spatiotemporal solitons in inhomogeneous nonlinear media, Opt. Commuin. 180, 377-382 (2000).

Renninger, W.H. et al., Spatiotemporal soliton laser, Optica 1, 101-104 (2014).

Renninger, W.H. et al., Pulse shaping and evolution in normal-dispersion mode-locked fiber lasers. IEEE J. Sel. Top. Quantum Electron., 18 (1), 389-398 (2012).

Richardson, D.J. et al., Space-division multiplexing in optical fibres. Nat. Photon. 7, 354-362 (2013).

Schawlow, A.L. et al., Infrared and optical masers, Phys. Rev. 112(6), 1940 (1958).

Smith, P.W., Simultaneous phase-locking of longitudinal and transverse laser modes, Appl. Phys. Left. 13, 235 (1968).

Turitsyna, E.G. et al., The laminar-turbulent transition in a fibre laser. Nat. Photon. 7 (10), 783-786 (2013).

Wiersma, D.S., The physics and applications of random lasers. Nat. Phys. 4 (5), 359-367 (2008).

Wright, L. et al., Spatiotemporal mode-locking in multimode fiber lasers, Science 358, 94097 (2017).

Wright, L.G. et al., Spatiotemporal dynamics of multimode optical solitons. Opt. Express 23, 3492-506 (2015).

Wright, L.G. et al., Self-organized instability in graded-index multimode fibres, Nat. Photon. 10, (12), 771-776 (2016).

Yu, S.-S. et al., Spatio-temporal solitary pulses in graded-index materials with Kerr nonlinearity, Opt. Commun. 119, 167-170 (1995).

\* cited by examiner (A mode-locked laser for mode locking of both selected longitudinal and transverse modes)

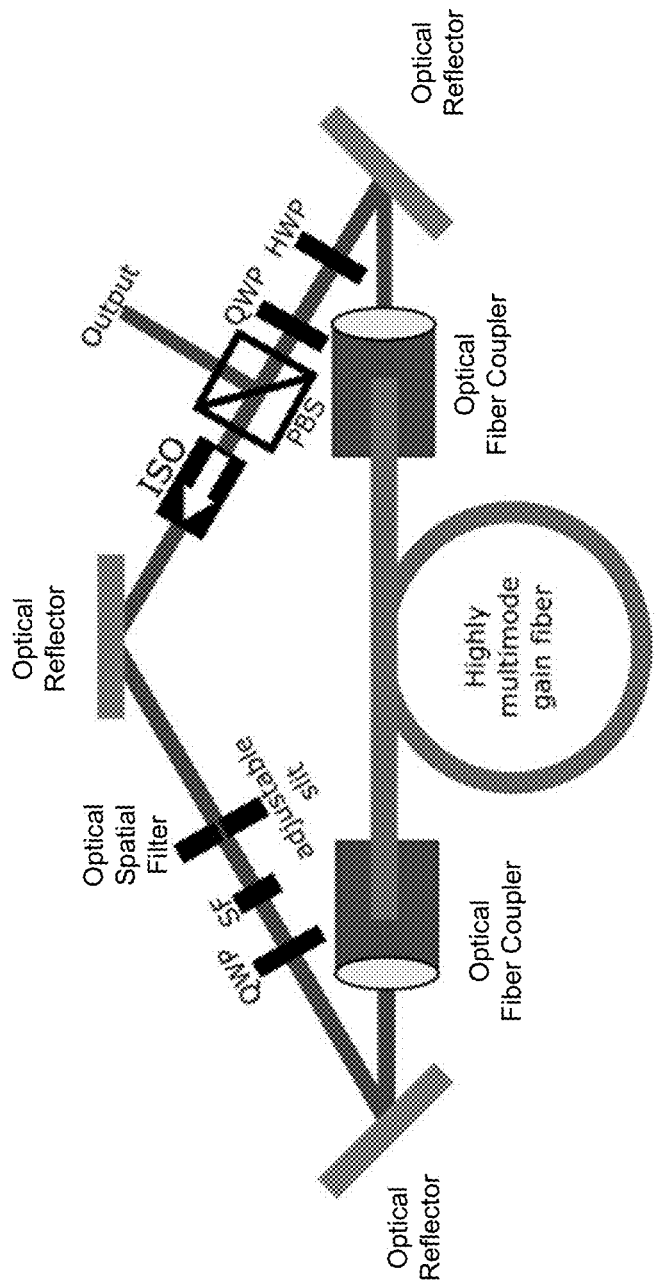
FIG. 2 (Ring Resonator Laser)

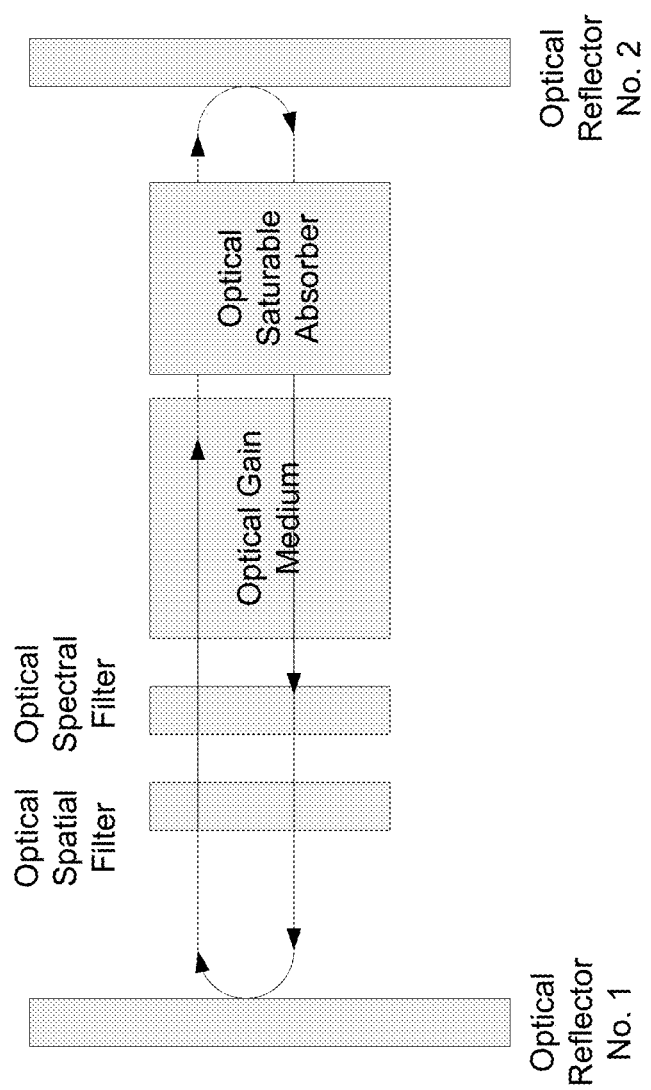
FIG. 3 (Fabry-Perot Resonator Laser)

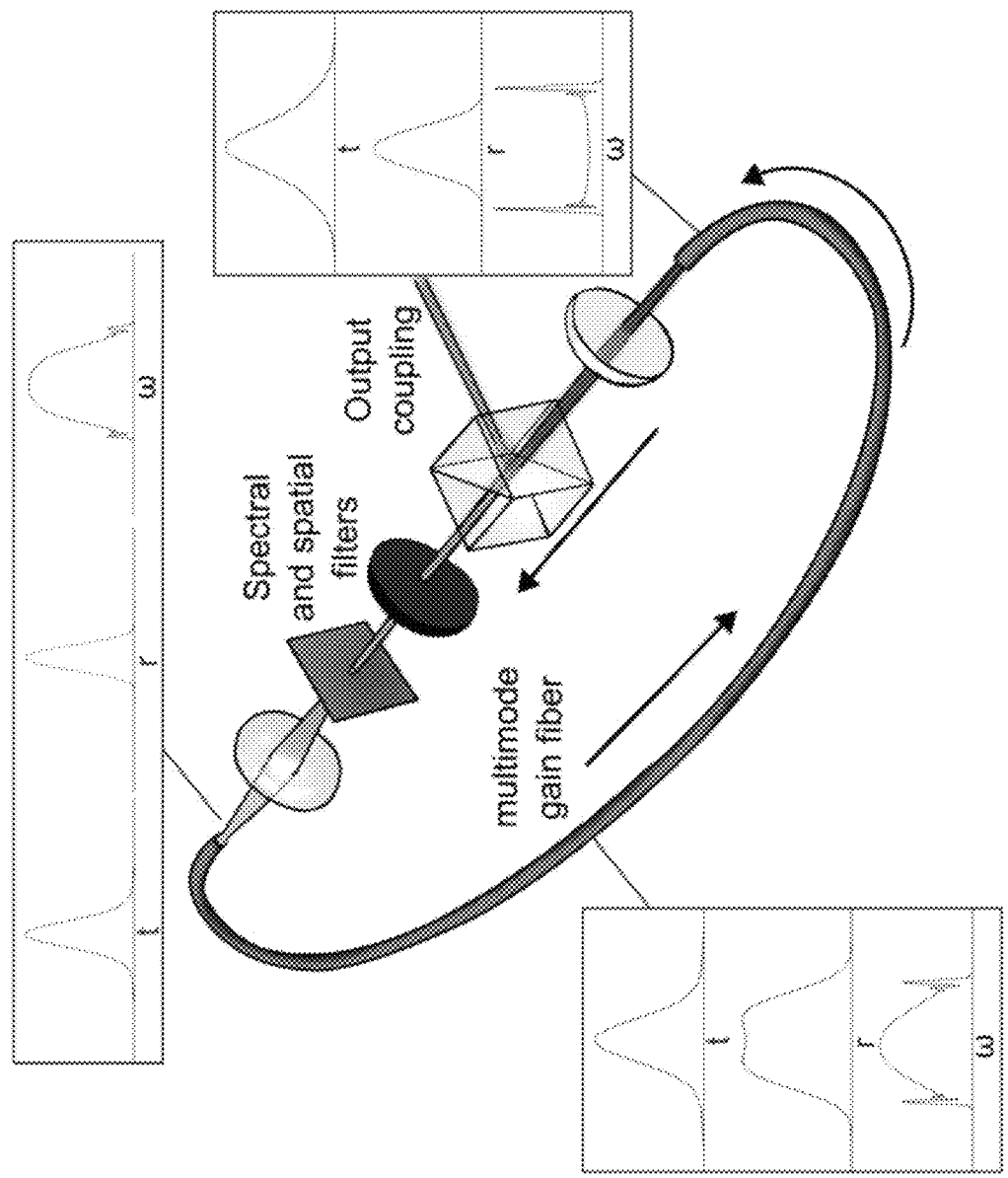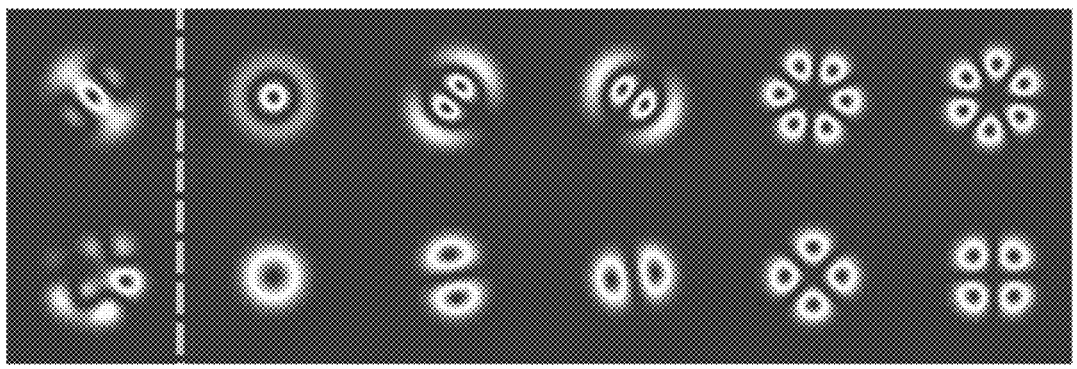
FIG. 4 (Ring Resonator Laser for Simulation)

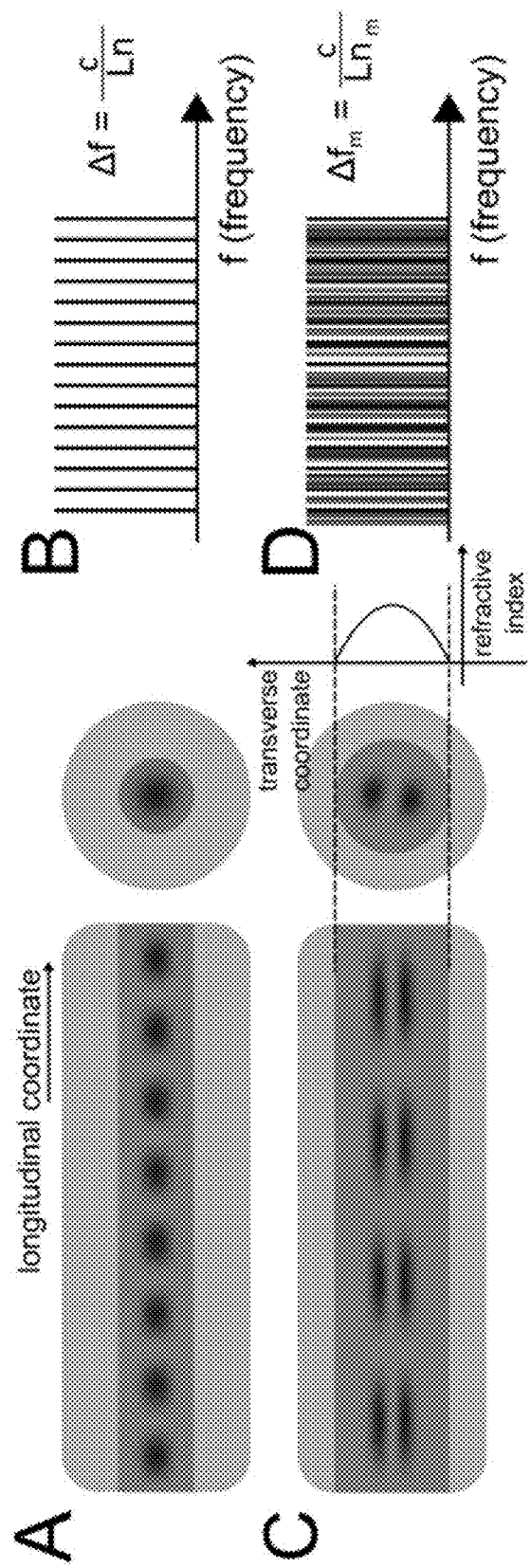
FIG. 5 (Ring Resonator Laser for Simulation)

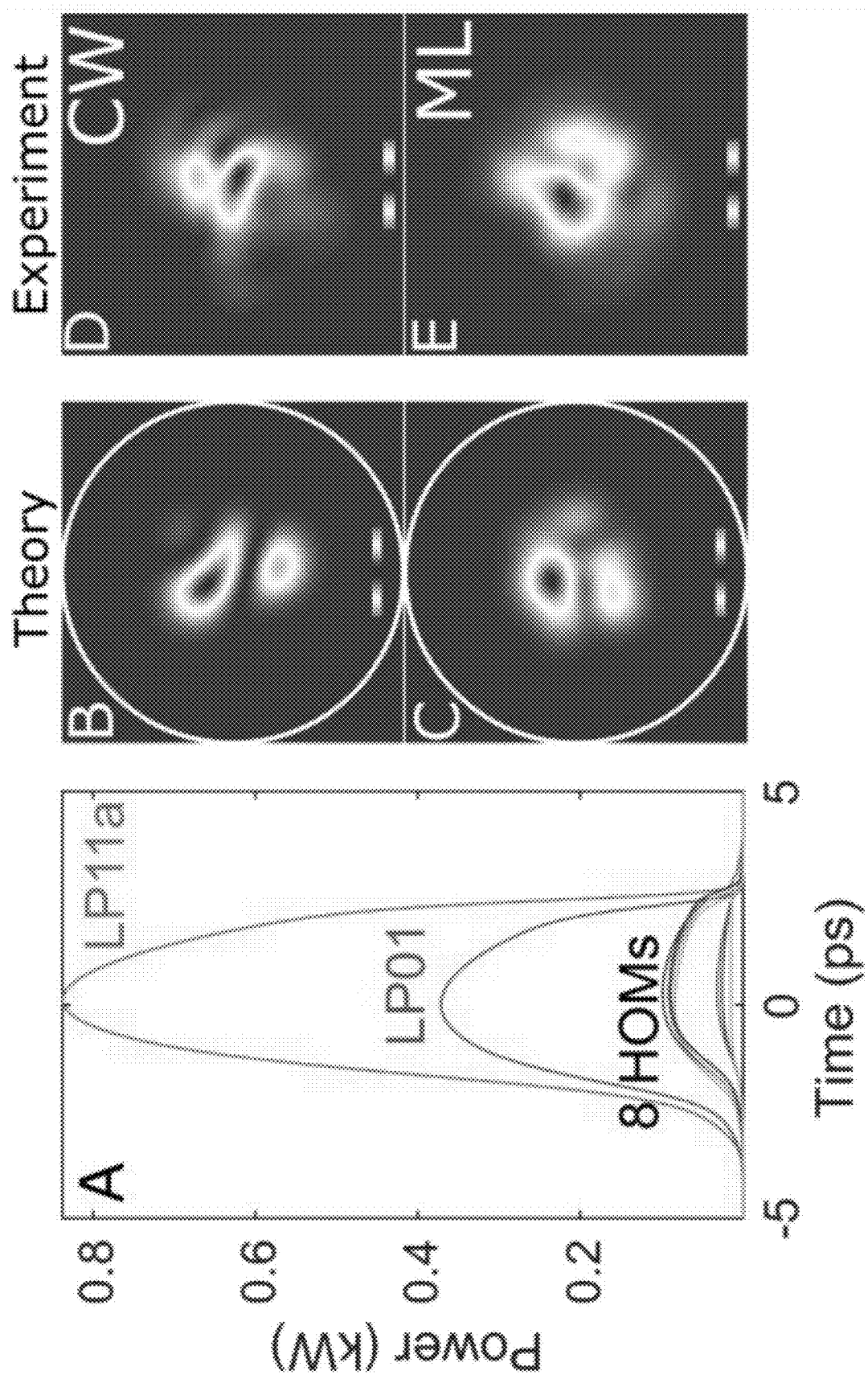
FIG. 6 (Ring Resonator Laser for Simulation)

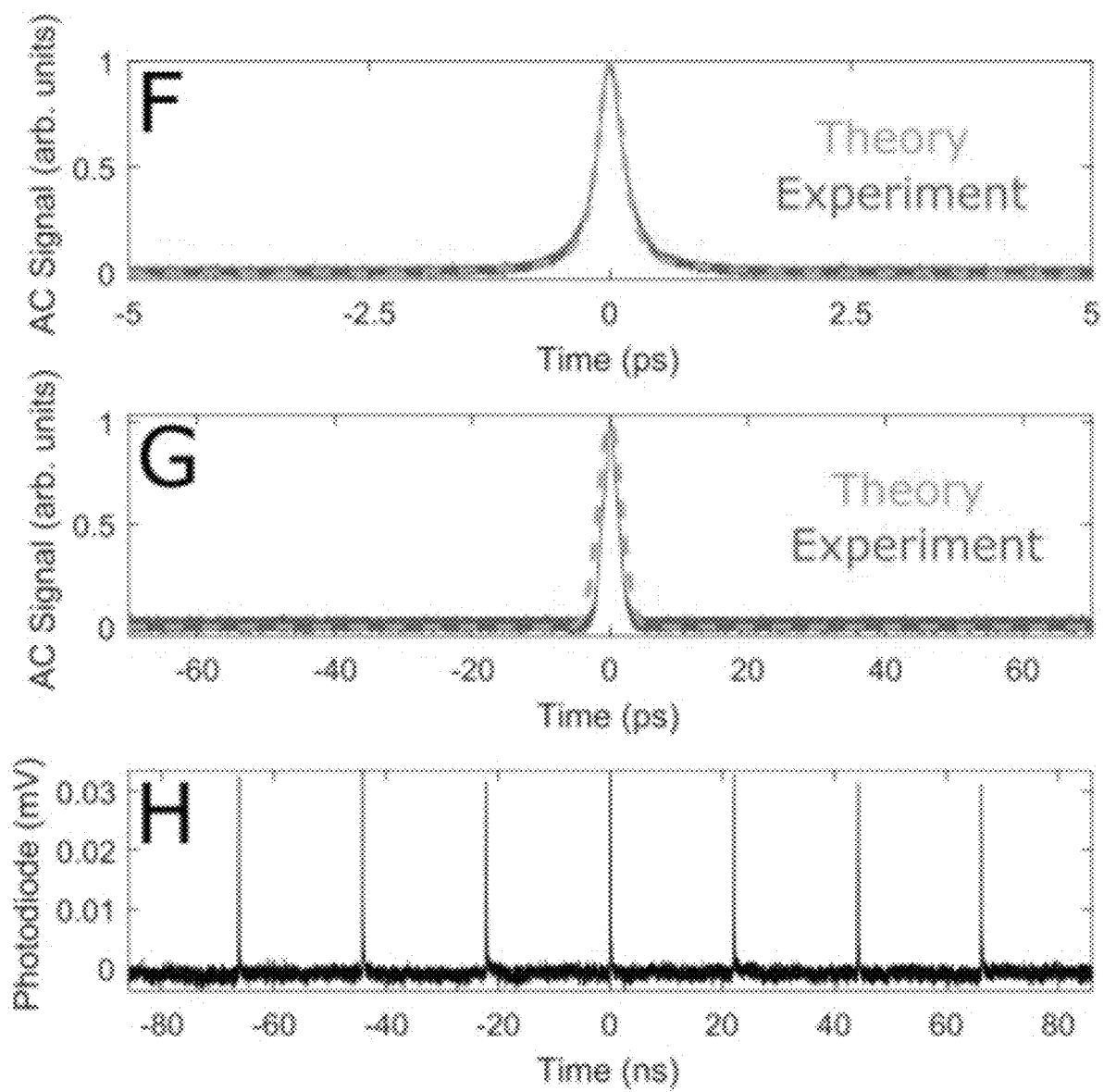
FIG. 6 (Ring Resonator Laser for Simulation)

PULSED LASERS BASED ON SPATIOTEMPORAL MODE-LOCKING

PRIORITY CLAIM AND RELATED PATENT APPLICATION

This patent document is timely filed on Dec. 31, 2018 to claim the priority and benefits of U.S. Provisional Patent Application No. 62/612,273 entitled "PULSED LASERS BASED ON SPATIOTEMPORAL MODE-LOCKING" and filed Dec. 29, 2017 by Applicant Cornell University.

STATEMENT REGARDING FEDERALLY SPONSORED RESEARCH OR DEVELOPMENT

This invention was made with government support under ECCS-1609129 awarded by the National Science Foundation and under N00014-13-1-0649 awarded by the Office of Naval Research (ONR). The government has certain rights in the invention.

TECHNICAL FIELD

This patent document relates to pulsed lasers based on mode locking of multiple different optical modes in an optical resonator of a laser.

BACKGROUND

A laser can be constructed by including an optical resonator and an optical gain medium in the optical resonator to produce a sufficient optical gain to light in the optical resonator to overcome the overall optical loss in the optical resonator to cause a desired laser oscillation. Such a laser may have various optical modes supported by the optical resonator and the intra-cavity optical gain medium. Pulsed lasers can be constructed by creating and maintaining a fixed phase relationship amongst different longitudinal optical modes with the same transverse mode so that those longitudinal optical modes are locked in phase and the optical interference of those locked modes produces laser pulses. Many mode-locked lasers for locking different longitudinal optical modes with the same transverse mode are designed to spatially select the fundamental transverse mode for locking the different longitudinal modes.

SUMMARY

The technology disclosed in this patent document allows mode locking of both selected longitudinal and transverse modes in a spatiotemporal mode-locked laser to produce laser pulses to achieve higher laser power per pulse and other properties. The laser light produced based on such mode locking exhibits a 3-dimensional electromagnetic field profile in which the locked longitudinal and transverse modes exhibit spatial and temporal properties that are different from laser pulses from mode locking of different longitudinal modes in a single transverse mode produced by various mode locked lasers. The inclusion of different transverse modes enables harvesting of laser energy in those different transverse modes for producing higher laser pulse energy than what is achievable by using only a single transverse mode of the different longitudinal mode.

For example, a mode-locked laser based on the disclosed mode locking of both selected longitudinal and transverse modes can be implemented to include an optical resonator structured to support longitudinal optical modes and transverse optical modes and to provide optical feedback for light to circulate in the optical resonator; an optical gain medium in the optical resonator to produce optical gain for light at a wavelength within a gain spectral range covering different laser wavelengths; an optical attenuation device located in the optical resonator and structured to attenuate light in the longitudinal and transverse optical modes and structured to exhibit a saturation in optical attenuation as an optical intensity increases to select light in certain longitudinal and transverse optical modes with a sufficiently high optical intensity to continue circulating in the optical resonator and being further amplified while suppressing light in other optical modes by optical attenuation; an optical spectral filter located in the optical resonator to select light in certain optical modes within a bandpass spectral range to transmit and to circulate in the optical resonator while filtering out light in other optical modes; and an optical spatial filter located in the optical resonator to select certain transverse optical modes to transmit and to circulate in the optical resonator while spatially blocking other transverse optical modes from being present in the optical resonator. In this example, the optical resonator, optical gain medium, the optical attenuation device, the optical spectral filter and the optical spatial filter are structured to collectively cause amounts of dispersions in selected longitudinal optical modes and selected transverse optical modes at selected laser wavelengths within the gain spectral range of the optical gain medium to be comparable and to cause the selected longitudinal optical modes and selected transverse optical modes to be locked in phase relative to one another to produce laser pulses.

The disclosed mode locking of both selected longitudinal and transverse modes in an optical resonator can be implemented in laser configurations that achieve higher pulse peak power than the peak power of laser pulses from mode locking of different longitudinal modes in a single transverse mode in part because the disclosed mode locking of both selected longitudinal and transverse modes enables light of more modes to participate the mode locking and generation of laser pulses and in part because mode locking of both selected longitudinal and transverse modes allows unique management of optical nonlinearities associated with the locked longitudinal and transverse modes. Accordingly, the disclosed mode locking of both selected longitudinal and transverse modes can be applied various applications that require high peak power laser pulses.

The disclosed mode locking of both selected longitudinal and transverse modes can also be used to observe and study various nonlinear optical processes caused by the co-existence of locked longitudinal and transverse modes and the optical behaviors in laser pulse propagation in such mode-locked lasers.

The laser light produced based on such mode locking exhibits a 3-dimensional mode profile based on the locked longitudinal and transverse modes with spatial and temporal properties that are different from laser pulses from mode locking of different transverse modes in a single transverse mode produced by various mode locked lasers.

In another aspect, the disclose technology can be implemented to provide a method for operating a mode-locked laser to generate laser pulses based on mode locking of both selected longitudinal and transverse modes. This method includes providing optically saturable absorption of laser light generated by the mode-locked layer in longitudinal and transverse optical modes exhibit a saturation in optical attenuation as an optical intensity increases to select light in certain longitudinal and transverse optical modes with a sufficiently high optical intensity to continue circulating in the mode-locked laser and being further amplified while suppressing light in other optical modes by optical attenuation; filtering spectral components in the laser light in certain longitudinal optical modes within a bandpass spectral range to circulate in the mode-locked laser while filtering out light in other longitudinal optical modes; spatially selecting certain transverse optical modes to circulate in the mode-locked laser while spatially blocking other transverse optical modes; and structuring the mode-locked laser to cause amounts of dispersions in selected longitudinal optical modes and selected transverse optical modes at selected laser wavelengths within the gain spectral range of the mode-locked laser to be comparable and to cause the selected longitudinal optical modes and selected transverse optical modes to be locked in phase relative to one another to produce laser pulses.

The above and other features and their implementations are described in greater detail in the drawings, the description and the claims.

BRIEF DESCRIPTION OF DRAWINGS

FIG. 2 shows a ring laser implementation example for the spatiotemporal mode-locked laser design in FIG. 1.

FIG. 3 shows a laser implementation example for the spatiotemporal mode-locked laser design in FIG. 1 by using a Fabry-Perot cavity.

FIGS. 4, 5, 6 and 7 show simulation and experimental results of spatiotemporal mode-locked laser examples.

DETAILED DESCRIPTION

Figure 1:
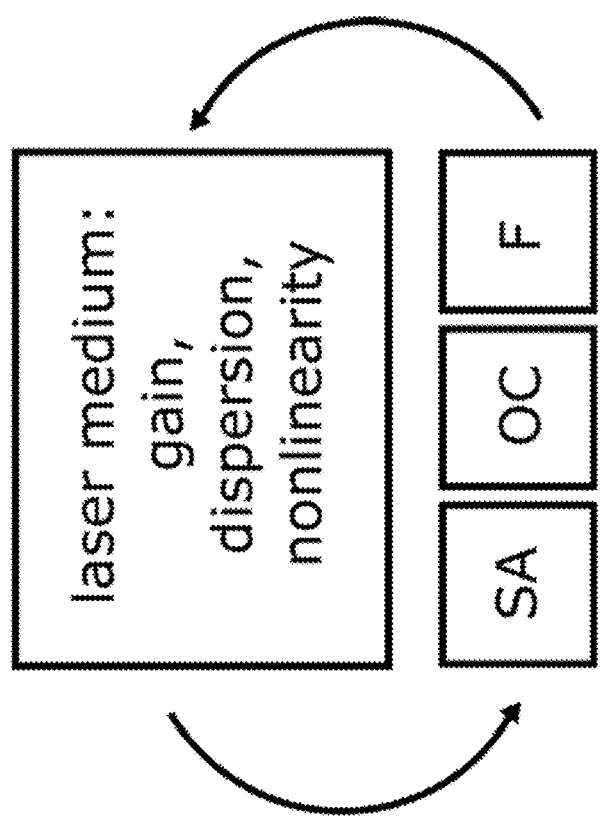
FIG. 1 shows a schematic example of a spatiotemporal mode-locked laser design capable of mode locking of both selected longitudinal and transverse modes (SA: saturable absorber; OC: output coupler; F: spatial and spectral filters).

Spatiotemporal mode-locking as disclosed here refers to a mode-locked laser that has different lasing modes which are locked together through nonlinear interactions within the laser cavity or resonator. A lasing mode is a three-dimensional electromagnetic field pattern within the laser cavity at a single resonant frequency. A laser mode n can be expressed generally as a time-variant spatial function:

$$\vec{E_n}(x,y,z,t) = \vec{F_n}(x,y,z) e^{i\omega_n t}$$

where z is the spatial location along the laser propagation direction or the optic axis of the laser cavity and x and y are the spatial locations in the plane perpendicular to the z direction. This mode has a three-dimensional electromagnetic field at a mode frequency of $f_n = \omega_n/2\pi$:

$$\vec{F_n}(x, y, z) = \begin{pmatrix} F_{nx}(x, y, z) \\ F_{ny}(x, y, z) \end{pmatrix}$$

where the x and y may be chosen as to be along the two possible orthogonal polarizations of the electromagnetic field.

The behaviors of these modes can be modeled mathematically by solving Maxwell-Bloch equations describing light in the laser cavity numerically or analytically. The laser light emitted by such a mode-locking laser can be written as a combination of different lasing modes, $$\vec{E_{laser}}(x,y,z,t) = \sum_{n=1}^{N} c_n \vec{F_n}(x,y,z) e^{i\omega_n t} \quad (1)$$

where the coefficients $c_n(t)$ are complex numbers and have different values. Under a mode-locked condition, there is a precise relationship established between all the $c_n(t)$ of the different laser modes, and typically, the relationship is that the complex numbers have the same phase or a fixed relative phase relationship.

In contrast, many mode-locked lasers sold on the market, widely used in research labs, or disclosed in literature, are based on the mode locking of selected longitudinal modes but in the same single transverse mode. In such a "single transverse mode" mode locking of different longitudinal modes, each of the locked lasing modes can be described by $$E_n(x,y,z,t) = \vec{F}(x,y) L_n(z) e^{i\omega_n t}$$

in which all of the lasing modes have exactly the same transverse electromagnetic field shape $\vec{F}(x, y)$, and vary only along the z-direction as different longitudinal modes $L_n(z)$. The mode locking occurs between different longitudinal modes with the same transverse field pattern $\vec{F}(x, y)$. This is accomplished in practice by forcing the laser to lase in only one transverse electromagnetic field pattern. For example, a laser cavity may be made out of single-mode optical fiber to force the different longitudinal modes to have the same single mode of the single-mode fiber. As a result, the lasing modes differ by their longitudinal field patterns $L_n(z)$ and oscillation frequencies and the optical field of the mode-locked laser output can be described by:

$$\vec{E_{laser}}(x,y,z,t) = \sum_{n=1}^{N} c_n \vec{F}(x,y) L_n(z) e^{i\omega_n t} \quad (2)$$

Different from the above mode locking of different longitudinal modes that have the same transverse mode profile, the disclosed technology in this document can be implemented to design mode-locked lasers to achieve mode locking of both selected longitudinal and transverse modes in an optical resonator, which is referred to as spatiotemporal mode-locking. Under such mode locking, the resultant electromagnetic field of the laser light includes lasing modes that vary in all three spatial dimensions. In other words, the beam profile (the appearance of the laser beam) is not always the same shape.

A spatiotemporal mode-locked laser that locks both selected longitudinal and transverse modes can be designed to include various features and the combination of various components of the laser and their interactions is designed, structured or chosen to enable the spatiotemporal mode-locking. One feature of such a laser is that multiple 3D modes coexist in a laser resonator when the laser is operating. This 3D mode may be generally represented by Equation (1) above. Under a mode-locked condition, the $c_n(t)$ should have a well-defined (i.e., not random) relationship that is stable over many oscillation periods. Another feature is a laser gain medium that can provide the desired optical gain at desired optical wavelengths for the generated mode-locked laser pulses to provide stimulated emission. The laser resonator should also be structured to provide desired optical feedback so that the laser light which is generated inside the laser medium is subsequently passed back into the laser medium periodically. Yet another feature of such a laser is inclusion of either a saturable absorber, a set of components that act as an artificial saturable absorber, an optical modulator, an external seed pulse, or a pump laser emitting pulses. These measures allow the laser to reach a pulsed operation spontaneously. Optical filtering can also be configured to provide for locking the selected longitudinal and transverse modes. For example, optical spatial and spectral filters can be placed inside the laser resonator to select certain longitudinal and transverse modes while suppressing other longitudinal and transverse modes. In some implementations, a spatial filter may be used to select desired transverse modes and a spectral filter may be used to select desired longitudinal modes. In some implementations, such two optical filtering functions may be embodied in one intracavity device or in different intracavity devices. In yet other implementations, one or more optical filtering devices may be provided inside the laser resonator to provide both spectral and spatial filtering functions.

In a single-transverse-mode mode-locked laser, nonlinear and linear coupling between different longitudinal modes with the same single transverse mode can counteract dispersion, shifting the lasing frequencies into a phase-locked frequency comb. In a mode-locked laser of multiple traverse modes and multiple longitudinal modes disclosed in this patent document, the modes are 3 dimensional with their dispersion includes both chromatic and modal dispersion. Notably, the nonlinear and linear coupling occurs not only between longitudinal modes but also transverse modes and the spatial dispersion (modal dispersion) should be small, or at least comparable to the chromatic dispersion to cause 3D mode-locking.

FIG. 1 shows an example of different components in a spatiotemporal mode-locked laser based on the disclosed technology in this patent document: a nonlinear, dispersive gain medium, a saturable absorber (SA) or a component equivalent to a SA device, an output coupler (OC), and filters (F) such as a spatial filter, a spectral filter, and/or a spatiospectral filter. The structures and properties of such a laser can be designed by investigating the evolution of the electromagnetic field of the laser light as it propagates and circulates through different parts of the laser. This can be done by solving Maxwell-Bloch equations to direct an electric field envelope $A(x; y; t; z)$, through the nonlinear, dispersive gain medium, apply a saturable absorber transfer function, then divide the field into output-coupled and feedback components, then filter the field by selected spatial and spectral filters, and then repeat the process. The propagation in a nonlinear, dispersive gain medium can be described by $$\partial_z A(x, y, t; z) = \frac{i}{2\beta(\omega_o)}\nabla_T^2 A - i\frac{\beta_2}{2}\partial_t^2 A + i\frac{\beta(\omega_o)}{2}[(n(x, y, z)/n_o)^2 - 1]A +$$

$$i\frac{n_2\omega_o}{c}|A|^2 A + \frac{g_o(\omega)}{1 + \int_{t_{max}}^{g_{max}}|A(x, y, t; z)|^2 dt/J_{sat}}A$$

where the last term represents the slowly-saturating gain, where $g_o(\omega)$ is the frequency-dependent small signal gain and $J_{sat}$ is the saturation fluence (energy density) of the gain medium. The integral's bounds here are over the simulation time window, which is a window of time around the pulse typically shorter than the round trip time. The parameters of the gain may also be functions of space (for example, to reflect an inhomogeneous dopant or pump distribution). Propagation through the saturable absorber, the filters, and output coupler can be described by spatiotemporal transmission functions as follows:

$$A(x, y, t; z) \to A(x, y, t; z)\sqrt{1 - \frac{\alpha_o}{1 + \frac{|A(x, y, t; z)|^2}{J_{sat}}}}$$

$$A(x, y, t; z) \to \sqrt{1 - OC}\, A(x, y, t; z)$$

$$A(x, y, \omega; z) \to F(x, y, \omega)A(x, y, \omega; z)$$

Here, $\alpha_o$ is the modulation depth, $I_{sat}$ is the saturation intensity of the saturable absorber, OC is the output coupling ratio ((the square root of OC) multiplied by $A(x; y; t; z)$ is the output field), and $F(x; y; \omega)$ is the filter transmission function for both spatial and spectral filtering. The optical gain medium may be pumped optically by using one or more optical pump beams in some implementations and may be pumped electrically by using a semiconductor gain material via injection a pump current.

For example, one implementation of the spatiotemporal mode-locked laser design in FIG. 1 can include a spectral filter and a spatial filter inside the laser resonator capable of mode locking of both selected longitudinal and transverse modes. In this example, the mode-locked laser can include an optical resonator structured to support longitudinal optical modes and transverse optical modes and to provide optical feedback for light to circulate in the optical resonator; an optical gain medium in the optical resonator to produce optical gain for light at a wavelength within a gain spectral range covering different laser wavelengths; and an optical attenuation device located in the optical resonator and structured to attenuate light in the longitudinal and transverse optical modes and structured to exhibit a saturation in optical attenuation as an optical intensity increases to select light in certain longitudinal and transverse optical modes with a sufficiently high optical intensity to continue circulating in the optical resonator and being further amplified while suppressing light in other optical modes by optical attenuation. In addition, this laser includes an optical spectral filter located in the optical resonator to select light in certain longitudinal optical modes within a bandpass spectral range to transmit and to circulate in the optical resonator while filtering out light in other longitudinal optical modes; and an optical spatial filter located in the optical resonator to select certain transverse optical modes to transmit and to circulate in the optical resonator while spatially blocking other transverse optical modes from being present in the optical resonator. This laser is structured so that the optical resonator, optical gain medium, the optical attenuation device, the optical spectral filter and the optical spatial filter collectively cause amounts of dispersions in selected longitudinal optical modes and selected transverse optical modes at selected laser wavelengths within the gain spectral range of the optical gain medium to be comparable and to cause the selected longitudinal optical modes and selected transverse optical modes to be locked in phase relative to one another to produce laser pulses.

Other implementations can be used to achieve lasing operations where the laser light has an electromagnetic field which varies in all three spatial dimensions (x, y, and z, or the transverse and longitudinal dimensions). In specific designs, a laser can be operated in the mode-locked or continuous wave mode, or both.

FIG. 2 shows a ring laser implementation of a spatiotemporal mode-locked laser using the design in FIG. 1 to provide mode locking of both selected longitudinal and transverse modes. This optical ring resonator provides a closed optical loop for laser light to circulate inside the ring resonator through optical reflectors, one or more multimode gain fiber segments with corresponding optical fiber couplers, an optical spectral filter (SF), a spatial filter implemented by an adjustable slit in the closed optical loop, an output optical coupler implemented by a polarization beam splitter (PBS) and an optical saturable absorber (SA). The SA in this example is implemented by using a nonlinear polarization evolution or rotation assembly as an effective saturable absorber and includes the polarization beam splitter (PBS) which also serves as the optical output coupler, and several birefringent wave plates such as one half-wave plate (HWP) and two quarterwave plates (QWPs) as shown. An optical isolator may also be used in this ring resonator to ensure the circulation of laser light in the counter clockwise direction illustrated in FIG. 2.

FIG. 3 shows an implementation of a spatiotemporal mode-locked laser using the design in FIG. 1 in a Fabry-Perot resonator configuration to provide mode locking of both selected longitudinal and transverse modes. Two optical reflectors 1 and 2 form the two end reflectors of the Fabry-Perot resonator to recirculate light inside the resonator. Spectral and spatial filters, the optical gain medium and the optical saturable absorber and other components are placed between the two optical reflectors.

FIG. 4 shows a ring laser for simulating the behaviors of a spatiotemporal mode-locked laser using the design in FIG. 1. The modes of this ring laser resonator are three-dimensional (3D) functions that vary along the axis of the resonator as well as in the two transverse dimensions. The pulse profiles in space, time and frequency are illustrated at three different locations at two ends of the multimode gain fiber and near the middle of the multimode gain fiber.

FIGS. 5A-D show various aspects this ring laser in FIG. 4. FIG. 5A shows one longitudinal mode with a single transverse mode (which is the fundamental mode). In ordinary mode-locking, lasing occurs in longitudinal eigenmodes, which correspond to different patterns of the electromagnetic lasing field along the length of the fiber and oscillate at different resonant frequencies forming an optical frequency comb in the frequency domain as shown in FIG. 5B. FIG. 5C shows a different longitudinal mode and a higher transverse mode in the laser. FIG. 5D shows a more complex pattern of the resonant frequencies of modes such as that in FIG. 5C. Each mode of this laser has a distinct resonant frequency as shown in FIGS. 5B and 5D). Referring to FIG. 4, the panel on the left-hand side shows examples of different transverse mode spatial patterns. In many cases of interest, the 3D modes are separable into so-called longitudinal and transverse modes. If the relative phases of the modes are not controlled, the output is an incoherent spatiotemporal field that results from random interference.

When the spatial filtering is designed to restrict the lasing operation to a single transverse mode at the fundamental transverse mode, a mode locking operation can be achieved with ultrashort pulse duration and ultralow noise but the average power is limited due to the lack of participation of higher transverse modes. Operation in multiple spatial modes, by contrast, can be used to allow optical energy in other transverse modes in the lasing operation to achieve high-average-power laser operation with significant complexity caused by the presence of other transverse modes.

One of the complex technical issues in allowing different transverse modes to lase in a mode-locked laser is nonlinear and dispersion effects in linear and nonlinear wave propagation in multiple transverse modes inside the laser resonator such as multimode optical fiber inside the laser resonator. In some implementations, the normal-dispersion mode-locking in space and time—strong spectral and spatial filtering in addition to the high nonlinearity, gain and spatiotemporal dispersion of the fiber medium—may be used to achieve spatiotemporal mode-locking. The self-organized, mode-locked pulses take a variety of spatiotemporal shapes consisting of many spatial and longitudinal modes.

Lasing modes can interact through the electronic nonlinearities of the gain, the saturable absorber, and the fiber medium itself. These effects occur on the time scale of a pulse, and thus can couple temporal and spatial degrees of freedom. The slow relaxation of rare-earth gain media introduces an additional layer of temporally-averaging nonlinear interactions. To demonstrate highly-multimode spatiotemporal mode-locking (STML), a testing cavity was constructed with few-mode, Yb-doped gain fiber (10 μm diameter, supporting ~3 transverse modes) spliced to a highly-multimode (MM) passive graded-index (GRIN) fiber (which supports ~100 transverse modes), thereby minimizing transverse gain interactions and isolating the key nonlinear interactions involved in passive mode-locking. The GRIN fiber was used so that the modal dispersion within the cavity can be relatively small, comparable to the chromatic dispersion. Excitation of many modes of the GRIN fiber is accomplished by fusing the two fibers with varying spatial offsets. A nonlinear polarization evolution or rotation assembly was used as an ultrafast saturable absorber. This cavity is readily-modelled by a set of coupled nonlinear Schrödinger equations (NLSEs), and has the secondary benefit of allowing observation of highly-MM mode-locking at relatively low laser powers. As a result, the cavity serves as a convenient experimental and theoretical test-bed for multimode laser dynamics.

Performed simulations for the ring laser model in FIG. 4 reveal a rich variety of stable spatiotemporal pulses. FIGS. 6A-C show that the laser generates distinct modal compositions in continuous wave (CW) operation (FIG. 6B) and the mode-locking operation (FIG. 6C). FIGS. 6D and 6E further show experimental images of laser beam profiles corresponding to the modes in FIGS. 6B and 6C, respectively. FIG. 6F shows the dechirped intensity autocorrelation for both simulation and experiment, FIG. 6G shows the autocorrelation for the chirped pulse over a 140 ps range, and FIG. 6H shows the pulse train measured using a photodiode with a ~40 ps resolution. Those simulation and experimental results show that the multimode beam in FIG. 6E corresponds to a single pulse that comprises >10 locked transverse modes, with no continuous-wave background.

The production of stable spatiotemporal mode-locking in the laser designs in this document may be understood through the comparable dispersion of transverse and longitudinal modes in GRIN fiber-based cavities, and the periodic spatial and spectral filtering we employ in the cavity. The formation and stability of these 3D mode-locked pulses is conceptually similar to 1D dissipative solitons and self-similar pulses in single-mode fiber lasers that employ normal dispersion and nonlinear phase modulation to produce a chirped pulse whose duration and bandwidth grows through most of the cavity. Strong spectral filtering of this chirped pulse reduces the duration and bandwidth, and so allows the pulse to meet the periodic boundary condition of the laser. In the current study, this approach is applied in space-time: in the multimode cavities, the combination of spatial and spectral filtering helps to establish a 3D steady-state pulse evolution with periodic boundary conditions in both space and time for the mode-locking. Since in GRIN fiber the magnitude of transverse mode dispersion is similar to the chromatic dispersion, coupling between all types of modes is equally strong. Hence in general mode-locking in such a 3D cavity involves numerous kinds of 3D modes.

Experimentally, spatial and spectral filtering are implemented through the overlap of the MM field with the gain fiber input, and a bandpass interference filter. With suitable adjustments of the filters and wave-plates (an experimental algorithm is described in the methods), a variety of highly MM (10-100 transverse modes) spatiotemporal mode-locking states can be observed. The pulse energies may range from 5 to 40 nJ, corresponding to routinely-available pump powers, and peak powers well below the threshold for end-facet damage. The evidence for spatiotemporal mode-locking is the sudden transition in the spatial, spectral and temporal properties as the pump power is increased or decreased through the mode-locking threshold: a spatiotemporal mode-locking transition involving nonlinear interactions between different transverse families of longitudinal modes. Without gain interactions, and because the output is taken directly after the passive GRIN fiber, the CW spatial beam profile also reveals the active lasing modes in the cavity when the laser is mode-locked. Conducted temporal measurements demonstrate that this spatiotemporal self-organization results in single pulses comprising many non-degenerate transverse mode families, as predicted by our simulations.

Additional simulation and experiments were conducted on spatiotemporal mode-locking in a ring laser cavity with a partially-graded, highly multimode Yb-doped gain fiber. With high power, and spectral and spatial filtering, different complex spatiotemporal dynamics were observed in numerical simulations, including stable mode-locked pulse trains. A spatial filtering is supplemented by an adjustable slit or iris illustrated in FIG. 2. Above a threshold pump power, STML lasing states are observed. As the pump power was adjusted, discontinuous changes in the field's spatial, temporal and spectral properties were observed as the laser underwent the transition from CW lasing in 10-100 transverse modes to multimode mode-locking where the output beam approximately had 2-10 modes. For this cavity, again a wide variety of different mode-locked states were observed for different cavity configurations. The minimum power for which mode-locking occurs in this laser corresponds to intracavity powers >100 kW. Consequently, systematic exploration of this laser and future engineering of practical instruments will require application of known techniques for avoiding fiber damage.

Figure 7:
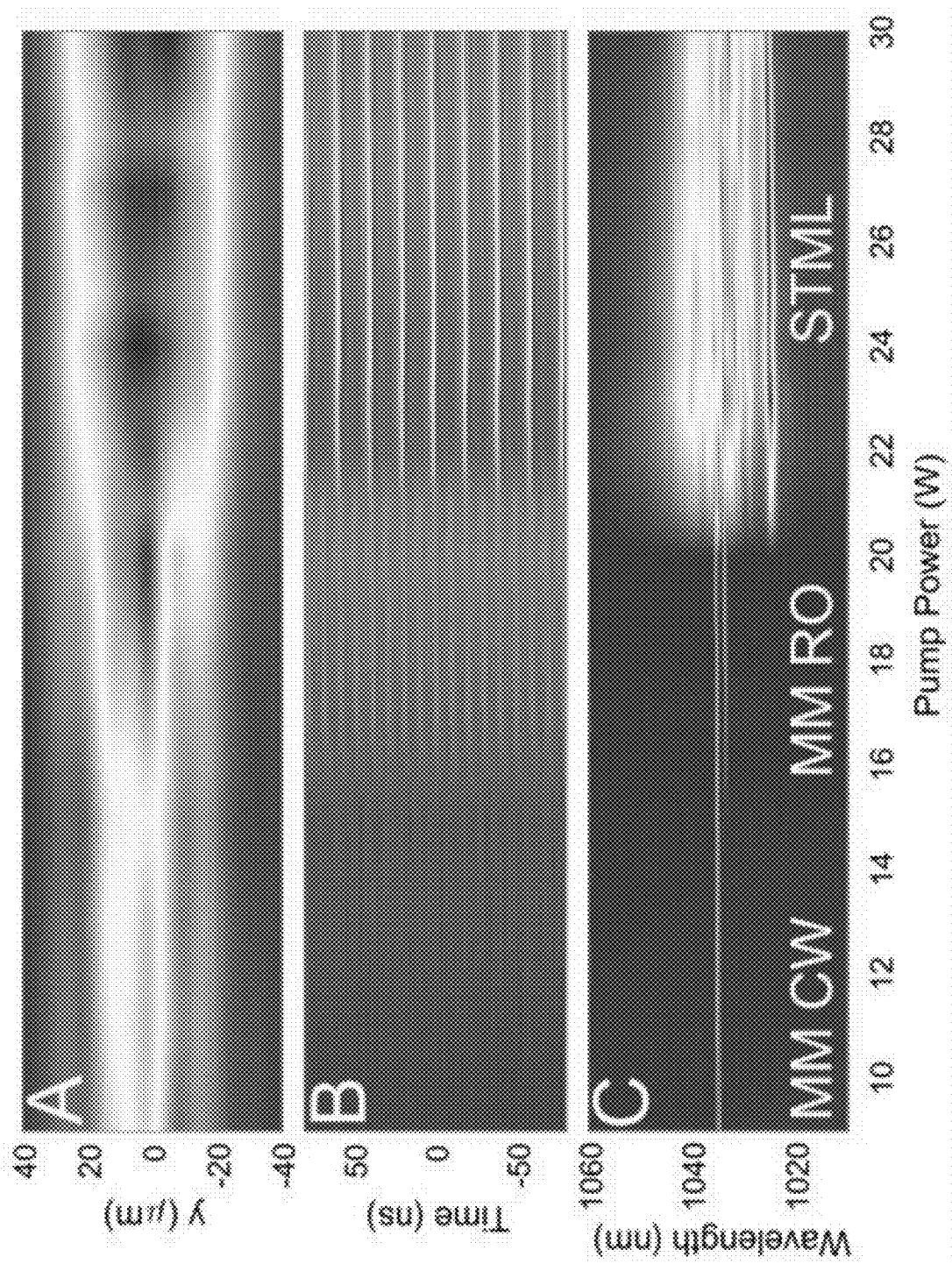
Figure 7:
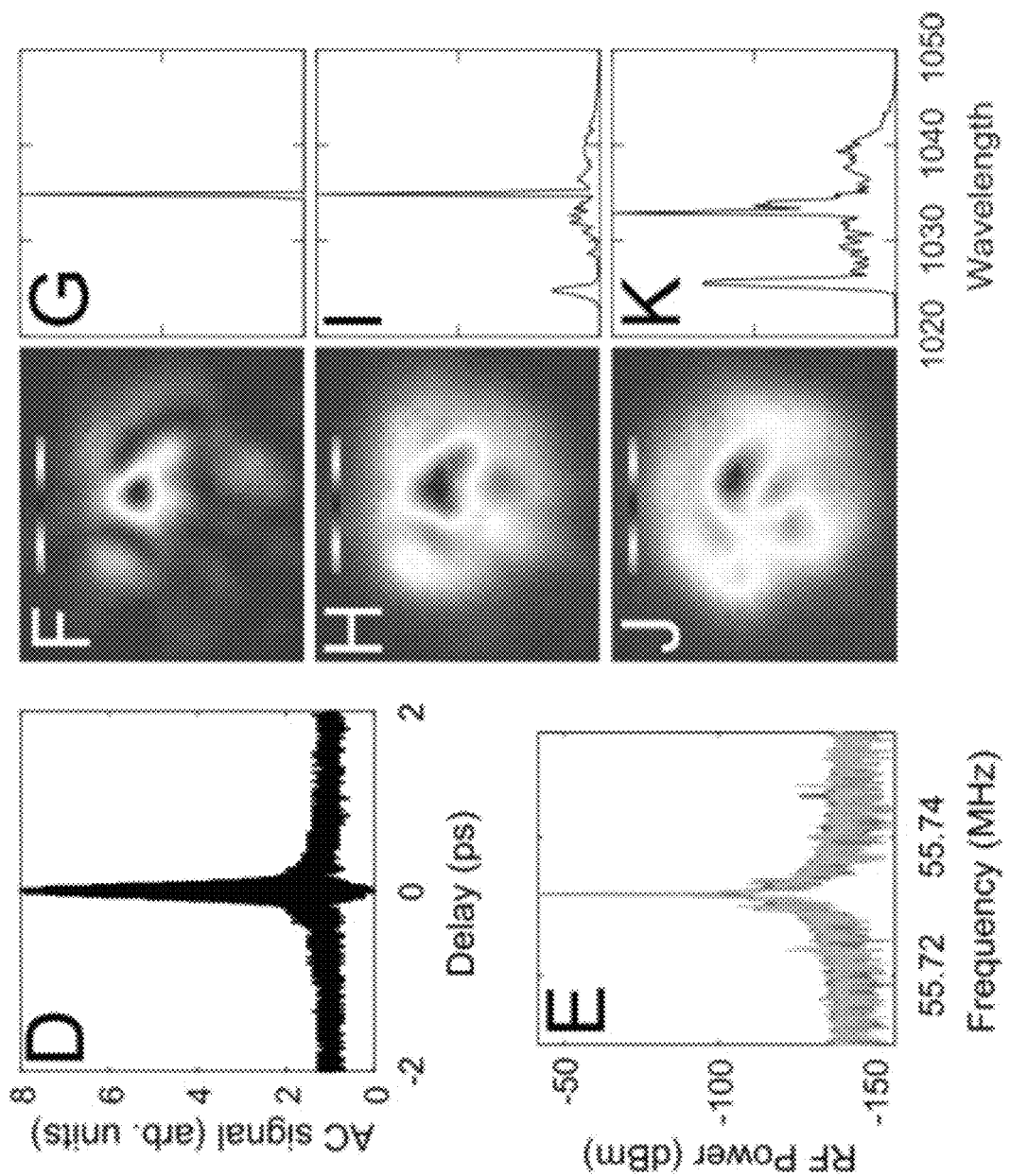

FIGS. 7A-K show results of the above simulation for the laser cavity with a partially-graded, highly multimode Yb-doped gain fiber with optical pumping. FIG. 7A shows the variation with pump power of the near-field beam profile integrated over 1 dimension, FIG. 7B shows the temporal variation of the output as the function of the pump power, and FIG. 7C shows the laser output spectrum as the function of the pump power. As the pump power is changed, the field transitions from multimode continuous-wave lasing (MM CW, FIGS. 7F and 7G) to relaxation oscillations (MM RO), to bistability with relaxation oscillations (~20-23 W, FIGS. 7H and 7I), and then to STML (FIGS. 7D, 7E, 7J, 7K). The CW lasing threshold is 9 W. The coherence of the mode-locked state is evident from the autocorrelation of the dechirped pulse (FIG. 7D) and the RF spectra (FIG. 7E, where the different colors correspond to measurements taken at different, arbitrary positions on the beam). The scale bar in FIGS. 7F, 7H, 7J shows the Gaussian profile of the fundamental mode of the fiber.

The disclosed lasers for 3D mode-locking can be used in short-pulse generation applications and other applications. The potential of MM mode-locked lasers for high performance is significant. Initial results demonstrate generation of 150-nJ and 150-fs pulses, for ~1-MW peak power and ~10-W average power, which already rival the best achieved with flexible, large-area single-mode fibers. With larger fiber core areas, scaling of pulse energy by over 2 orders of magnitude may be possible for a range of applications. The ability to generate high-power and spatiotemporally-engineered coherent light fields should lead to breakthroughs in laser science as well as applications.

Figure 8:
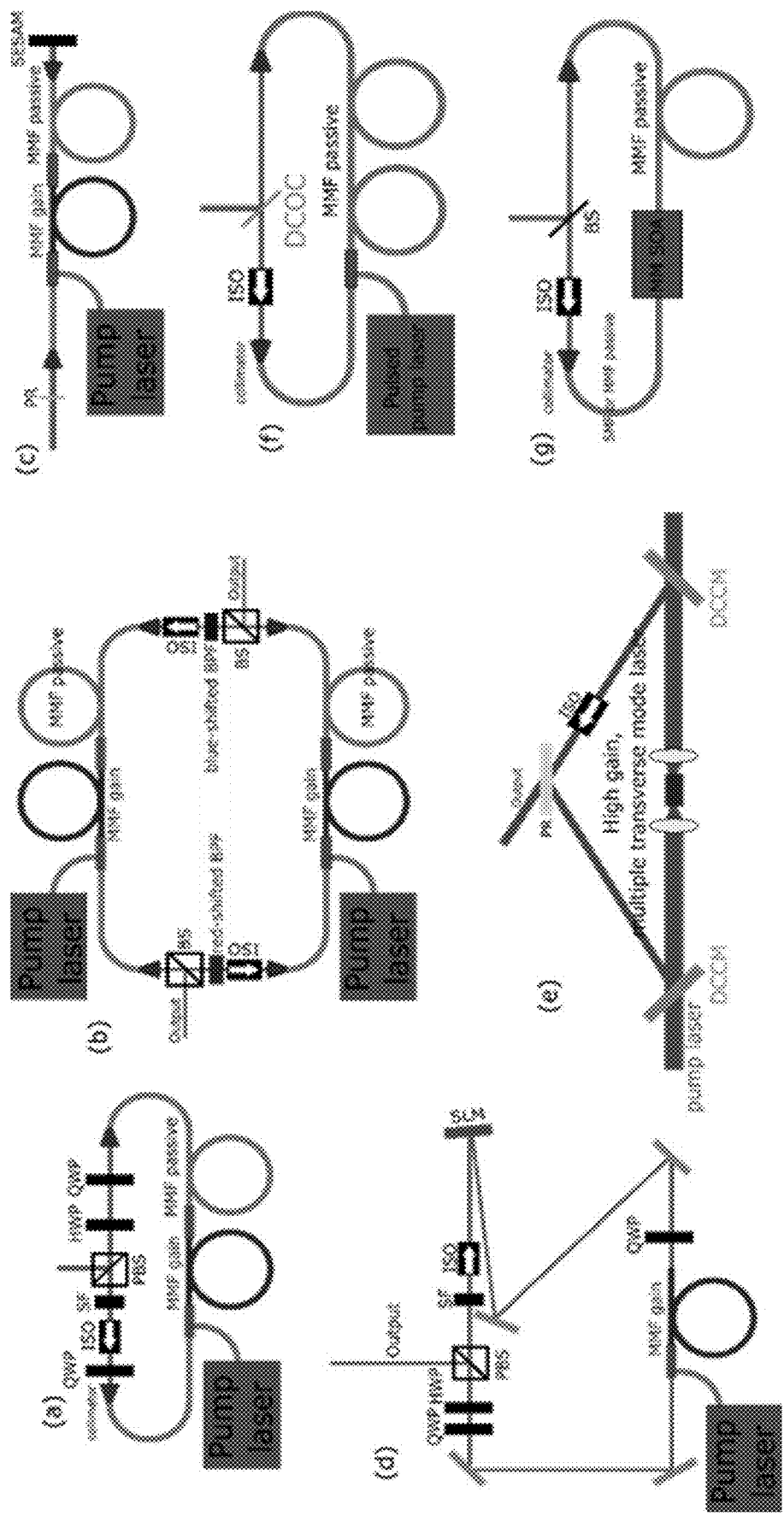
FIG. 8 shows some examples of implementations of a spatiotemporal mode-locked laser based on the disclosed technology, in which the following legends are used
QWP, HWP: quarter and half wave plates;
MMF: multimode or multicore fiber;
PBS: polarizing beamsplitter;
BPF: bandpass spectral filter;
SF: spectral filter;
PR: partial reflector;
DCCM: dichroic curved mirror;
ISO: isolator;
SOA: semiconductor optical amplifier;
BS: non-polarizing beamsplitter;
DCOC: dichroic output coupler;
SESAM: semiconductor saturable absorbing mirror; and
SLM: spatial light modulator.

The above disclosed 3D mode locking lasers can be implemented in various configurations. FIG. 8 shows some examples of implementations of a spatiotemporal mode-locked laser:

1. A ring cavity made of a multimode (or multicore) fiber doped with rare-earth ions, using nonlinear polarization rotation as an artificial saturable absorber (FIG. 8a).

2. A ring cavity made of a multimode (or multicore) fiber doped with rare-earth ions, using offset spectral filtering as an artificial saturable absorber (FIG. 8b). Two optical spectral filters are provided to provide the desired offset spectral filtering that is commonly used in an optical Mamyshev oscillator. See "Self-seeded, multi-megawatt, Mamyshev oscillator" in Optics Letters, Vol. 43, Issue 11, pp. 2672-2675 (2018) (https://www.osapublishing.org/ol/abstract.cfm?uri=ol-43-11-2672) and "Megawatt peak power from a Mamyshev oscillator" in Optica, Vol. 4, Issue 6, pp. 649-654 (2017) (https://www.osapublishing.org/optica/abstract.cfm?uri=optica-4-6-649), which are incorporated by reference as part of the disclosure of this patent document. As illustrated in FIG. 8b, two optical spectral filters, the red-shifted bandpass filter (BPF) and the blue-shifted bandpass filter (BPF) are designed to have their BPF center wavelengths to be longer (red-shifted) and shorter (blue-shifted) relative to the peak wavelength of the gain spectrum for shaping the generated laser pulses.

3. A linear cavity made of a multimode (or multicore) fiber doped with rare-earth ions, using a semiconductor saturable absorbing mirror (SESAM) as a saturable absorber (FIG. 8c).

4. A ring cavity with multimode (or multicore) fiber doped with rare earth-ions, with nonlinear polarization rotation as an artificial saturable absorber, with the lasing modes controlled by a spatial light modulator (FIG. 8d).

5. A ring cavity made of curved mirrors with a Ti-doped sapphire crystal as the laser medium, and nonlinear organization of light into a high-gain configuration ('generalized Kerr lensing') provides effective saturable absorption (FIG. 8e). Like some other implementations, here the laser is structured to support multiple transverse modes when lasing in continuous wave or mode-locked operation or both.

6. A ring cavity made of multimode optical fiber, where pulses from an external laser are injected and provide laser gain through the Raman effect within the glass making up the optical fiber (FIG. 8f).

7. A ring cavity comprised of multimode optical fiber, coupled into a multimode semiconductor optical amplifier, where nonlinear transmission in the multimode fiber leads to pulse formation (FIG. 8g).

Various features of the disclosed technology for constructing a mode-locked laser that produces laser pulses based on mode locking of both selected longitudinal and transverse modes are further explained in an academic publication by the inventors of this patent document entitled "Spatiotemporal mode-locking in multimode fiber lasers," Science 358 (6359), 94-97 (2017) (http://science.sciencemag.org/content/358/6359/94), which is incorporated by reference as part of the disclosure of this patent document.

The presence of multiple transverse modes in the disclosed mode-locked lasers tends to cause patterns in the beam spatial distribution profile that may be undesirable for some applications. One technique for improving the spatial beam quality is scaling of power and intensity of short-pulse fiber lasers with the number of transverse modes, rather than with the area of a single mode. This technique is based on the recognition that excessive nonlinear phase accumulation limits short-pulse generation and propagation, and manifests as spectral, temporal, or spatial distortions. In laser cavities, a common symptom of excessive nonlinear phase is splitting of a pulse at a threshold pump power. This is referred to as "multi-pulsing." Much progress in scaling power has been made through the development of microstructure fibers with large single-mode areas. However, this seems to be reaching its limits, and the structure can complicate integration.

An alternative is scaling of power and intensity of short-pulse fiber lasers with the number of transverse modes. Kerr beam-cleanup is a natural candidate for converting a multimode beam to one that is closer to the diffraction limit. Beam cleanup typically yields ~50% of the energy in the fundamental mode. If the energy can be scaled by factor of M in a multimode laser, the output would scale by a factor of M/2, which will be very attractive for large M. However, in a lossless system the cleaned beam is unstable at high power owing to spatiotemporal modulation instability, as discussed above.

Figure 9:
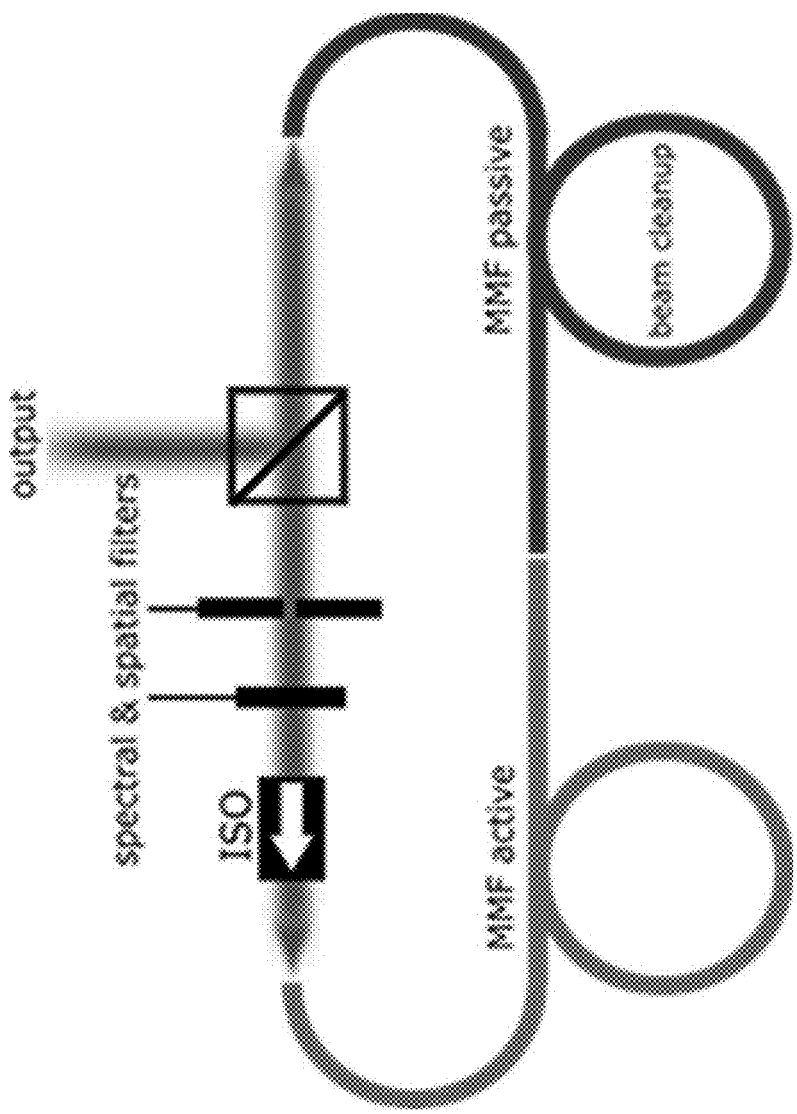
FIG. 9 shows an example for implementing beam cleaning by coupling a passive MMF segment in a ring laser for 3D mode locking.

FIG. 9 shows an example for implementing the beam cleaning in a ring laser for 3D mode locking. A passive MMF segment is coupled inside the ring laser so that nonlinear loss will convert the unstable 2D attractor of passive systems to a stable 3D attractor. In conjunction with a spatial filter, the cleanup process may also act as an effective saturable absorber, analogous to a Kerr lens. It may be possible to exploit beam cleanup directly in the gain segment as an alternative to or in addition to, the beam cleanup in passive fiber. Investigations conducted on beam cleanup with picosecond and femtosecond pulses indicated that temporal coherence can be maintained in the process. Initial simulations show cleanup of 100-nJ pulses occurring about 100 round trips of the cavity after initiation of lasing, with 4 of the 6 modes of the fiber locked in a 1-ps pulse. Some cleanup occurs in the gain fiber, and some in the passive fiber. Multicore fibers (MCF) with coupled cores can be engineered for low modal dispersion, large mode area, and desired number of modes. 3D mode locking lasers may be constructed as in FIG. 9 but with active MCF in place of the active multimode fiber.

In some implementations, a spatiotemporal mode-locked laser capable of mode locking of both selected longitudinal and transverse modes may be configured to have an "all normal dispersion" laser cavity which is free of anomalous dispersion and whose dispersion elements inside the cavity consist only of elements with normal group velocity dispersion. See, Cornell University's U.S. Pat. No. 8,416,817 B2 entitled "All-normal-dispersion femtosecond fiber laser" for additional details, which is incorporated by reference as part of the disclosure of this patent document. In other implementations, a spatiotemporal mode-locked laser capable of mode locking of both selected longitudinal and transverse modes may be configured to include both normal dispersion and anomalous dispersion elements inside the laser cavity.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described or illustrated, including:

1. A mode-locked laser that produces laser pulses based on mode locking of both selected longitudinal and transverse modes, comprising:
   an optical resonator structured to support longitudinal optical modes and transverse optical modes and to provide optical feedback for light to circulate in the optical resonator;
   an optical gain medium in the optical resonator to produce optical gain for light at a wavelength within a gain spectral range covering different laser wavelengths;
   an optical attenuation device located in the optical resonator and structured to attenuate light in the longitudinal and transverse optical modes and structured to exhibit a saturation in optical attenuation as an optical intensity increases to select light in certain longitudinal and transverse optical modes with a sufficiently high optical intensity to continue circulating in the optical resonator and being further amplified while suppressing light in other optical modes by optical attenuation;

an optical spectral filter located in the optical resonator to select light in certain longitudinal optical modes within a bandpass spectral range to transmit and to circulate in the optical resonator while filtering out light in other longitudinal optical modes; and an optical spatial filter located in the optical resonator to select certain transverse optical modes to transmit and to circulate in the optical resonator while spatially blocking other transverse optical modes from being present in the optical resonator, wherein the optical resonator, optical gain medium, the optical attenuation device, the optical spectral filter and the optical spatial filter are structured to collectively cause amounts of dispersions in selected longitudinal optical modes and selected transverse optical modes at selected laser wavelengths within the gain spectral range of the optical gain medium to be comparable and to cause the selected longitudinal optical modes and selected transverse optical modes to be locked in phase relative to one another to produce laser pulses.

2. The mode-locked laser as in claim 1, wherein:
the optical gain medium includes a doped fiber section to produce the optical gain under optical pump by pump light at a pump wavelength.

3. The mode-locked laser as in claim 1, wherein:
the optical gain medium includes a doped crystal material to produce the optical gain under optical pump by pump light at a pump wavelength.

4. The mode-locked laser as in claim 1, wherein:
the optical gain medium includes a semiconductor material to produce the optical gain under optical pump by pump light at a pump wavelength.

5. The mode-locked laser as in claim 1, wherein:
the optical gain medium includes a semiconductor optical amplifier to produce the optical gain when an electrical voltage or current is applied.

6. The mode-locked laser as in claim 1, wherein:
the optical resonator includes a Fabry-Perot resonator that includes two end reflectors to bounce light therebetween.

7. The mode-locked laser as in claim 6, wherein:
one of the two end reflectors includes a semiconductor saturable absorber device and an optical reflector.

8. The mode-locked laser as in claim 1, wherein:
the optical resonator includes an optical ring resonator having a closed optical loop to circulate light within the optical ring resonator.

9. The mode-locked laser as in claim 8, wherein:
the optical ring resonator includes one or more fiber sections to guide the light while circulating in the optical ring resonator.

10. The mode-locked laser as in claim 8, wherein:
the optical ring resonator includes one or more waveguide sections formed on a substrate to guide the light.

11. The mode-locked laser as in claim 8, wherein:
the optical ring resonator includes optical reflectors arranged at different locations as part of the closed optical loop to guide the light.

12. The mode-locked laser as in claim 1, wherein:
the optical attenuation device includes an optical saturable absorber.

13. The mode-locked laser as in claim 1, wherein:
the optical attenuation device includes an optical assembly of optical wave plates and a polarization beam splitter to produce an effective saturable absorption based on nonlinear polarization rotation.

14. The mode-locked laser as in claim 1, wherein:
the optical attenuation device includes an optical modulator that produces a periodic modulation on light.

15. The mode-locked laser as in claim 1, wherein:
the spatial filter is structured to allow transmission of light in different transverse modes of the optical resonator to continue circulating.

16. The mode-locked laser as in claim 1, wherein:
the optical resonator includes only optical components exhibiting normal group velocity dispersion.

17. The mode-locked laser as in claim 1, wherein:
the optical resonator includes optical components exhibiting normal group velocity dispersion and anomalous dispersion.

18. A method for operating a mode-locked laser to generate laser pulses based on mode locking of both selected longitudinal and transverse modes, comprising:

providing optically saturable absorption of laser light generated by the mode-locked laser in longitudinal and transverse optical modes exhibit a saturation in optical attenuation as an optical intensity increases to select light in certain longitudinal and transverse optical modes with a sufficiently high optical intensity to continue circulating in the mode-locked laser and being further amplified while suppressing light in other optical modes by optical attenuation;

filtering spectral components in the laser light in certain longitudinal optical modes within a bandpass spectral range to circulate in the mode-locked laser while filtering out light in other longitudinal optical modes;

spatially selecting certain transverse optical modes to circulate in the mode-locked laser while spatially blocking other transverse optical modes; and structuring the mode-locked laser to cause amounts of dispersions in selected longitudinal optical modes and selected transverse optical modes at selected laser wavelengths within the gain spectral range of the mode-locked laser to be comparable and to cause the selected longitudinal optical modes and selected transverse optical modes to be locked in phase relative to one another to produce laser pulses.

19. The method as in claim 18, further comprising:
providing a passive optical material segment inside the mode-locked laser to improve a beam quality of the laser pulses.

20. The method as in claim 18, wherein:
filtering spectral components in the laser light includes using two optical bandpass spectral filters designed to have filter center wavelengths to be, respectively, longer and shorter than a peak wavelength of a gain spectrum of the mode-locked laser for shaping the laser pulses.

* * * * *